(12) United States Patent
Fuse et al.

(10) Patent No.: US 7,771,303 B2
(45) Date of Patent: Aug. 10, 2010

(54) CHAIN GUIDE DEVICE

(75) Inventors: Tomohiro Fuse, Saitama (JP); Shinya Nishiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 11/504,699

(22) Filed: Aug. 16, 2006

(65) Prior Publication Data

US 2007/0042847 A1 Feb. 22, 2007

(30) Foreign Application Priority Data

Aug. 19, 2005 (JP) ............................. 2005-238656

(51) Int. Cl.
*B62J 13/00* (2006.01)
*F16H 7/18* (2006.01)
(52) U.S. Cl. ..................... 474/144; 474/111; 474/140
(58) Field of Classification Search ................. 474/140, 474/144, 111
See application file for complete search history.

(56) References Cited

U.S. PATENT DOCUMENTS

| D532,720 S | * | 11/2006 | McGarry | .................. D12/127 |
| 2005/0159260 A1 | * | 7/2005 | Gogo | .......................... 474/111 |
| 2007/0032324 A1 | * | 2/2007 | Uchiyama et al. | ........... 474/140 |

FOREIGN PATENT DOCUMENTS

| JP | 05-20637 | * | 5/1993 |
| JP | 05193548 A | * | 8/1993 |
| JP | 05193549 A | * | 8/1993 |
| JP | 06144341 A | * | 5/1994 |
| JP | 08-207870 A | | 8/1996 |
| JP | 2002120786 A | * | 4/2002 |

OTHER PUBLICATIONS

JP1993193549, English translation of JP 51-93549.*

* cited by examiner

*Primary Examiner*—Robert A Siconolfi
*Assistant Examiner*—Stephen Bowes
(74) *Attorney, Agent, or Firm*—Birch, Stewart, Kolasch & Birch, LLP

(57) ABSTRACT

A chain guide for guiding a chain includes a chain passage formed by an outer side wall and an inner side wall for surrounding the chain passage. A front end portion of the inner side wall is retracted to and is positioned at a rear side of a vehicle body than a front end portion of the outer side wall. Guide ribs are formed on an upper wall and a bottom wall and are brought into sliding contact with upper and lower sides of the chain. A discharge recessed portion which is opened frontwardly from the front end portion is formed in the inner side wall, wherein the chain passage is in communication with the outside through the discharge recessed portion. Mud or the like which is carried into an inlet falls in the inside of a vehicle body disposed outside the chain guide from the discharge recessed portion

20 Claims, 8 Drawing Sheets

CHAIN GUIDE DEVICE

CROSS-REFERENCE TO RELATED APPLICATIONS

The present application claims priority under 35 USC 119 to Japanese Patent Application No. 2005-238656 filed on Aug. 19, 2005 the entire contents of which are hereby incorporated by reference.

FIELD OF THE INVENTION

The present invention relates to a chain guide device which is used in a chain-driven vehicle such as a motorcycle.

DESCRIPTION OF BACKGROUND ART

To restrict the slackening of a chain, there has been known a chain guide which forms a tunnel-like chain passage in a resilient body for allowing a chain to penetrate the chain passage and for bringing the chain into sliding contact with a bottom wall surface thereof. In such a chain guide, a structure is known in which longitudinal positions of respective front end portions of left and right side walls which constitute the chain passage are aligned, and a projecting guide rib which extends in the longitudinal direction is formed on the bottom wall surface with which the chain is brought into slide contact. See, for example, JP-A-8-207870.

With respect to an off-road vehicle which travels on rough terrain, at the time of performing cornering by inclining a vehicle body to a side on which a chain guide is provided or at the time of performing track traveling, the vehicle is operated while bringing a vehicle-body-outside side wall of the chain guide, into contact with a muddy road surface and there exists a possibility that mud or the like intrudes on the inside of the chain guide from the vicinity of a chain inlet of the chain guide. Since front end portions of left and right side walls of the chain guide are arranged at the same position, the mud or the like is not discharged at the inlet side and is discharged only from an outlet side.

SUMMARY AND OBJECTS OF THE INVENTION

Accordingly, it is an object of an embodiment of the present invention to enable the discharge of mud at a plurality of portions.

To achieve the above-mentioned object, an object of an embodiment of the present invention is directed to a chain guide device which is mounted on a swing arm which supports a rear wheel driven by a chain by way of a chain guide stay, wherein the chain guide device includes an inner side wall and an outer side wall which are arranged along both left and right sides of the chain as portions of a wall portion of a chain passage which is provided to allow the chain to penetrate therethrough in the longitudinal direction. A front end portion of the inner side wall is positioned behind a front end portion of the outer side wall.

According to an object of an embodiment of the present invention, a chain guide device is mounted on a swing arm which supports a rear wheel driven by a chain by way of a chain guide stay, wherein the chain guide device includes an inner side wall and an outer side wall which are arranged along both left and right sides of the chain as portions of a wall portion of a chain passage which is provided to allow the chain to penetrate therethrough in the longitudinal direction, and the chain guide device includes a discharge recessed portion which is opened frontwardly from a front end portion of the inner side wall.

According to an object of an embodiment of the present invention, a chain guide device is mounted on a swing arm which supports a rear wheel driven by a chain by way of a chain guide stay, wherein the chain guide device includes an inner side wall and an outer side wall which are arranged along both left and right sides of the chain as portions of a wall portion of a chain passage which is provided to allow the chain to penetrate therethrough in the longitudinal direction, and the inner side wall forms a communication portion which allows the outside and the chain passage to be communicated with each other therein at a position behind the outer side wall.

According to an object of an embodiment of the present invention, the chain guide device includes a chain guide plate which is mounted on an outside of the outer side wall in an overlapped manner. A positioning recessed portion is opened frontwardly and is formed in a front end portion of the chain guide plate. A positioning projecting portion projects outwardly and is integrally formed on a side surface of the outer side wall and is fitted in the positioning recessed portion.

According to an object of an embodiment of the present invention, an upper wall portion and a bottom wall portion which constitute upper and lower portions thereof as a portion of the chain passage, and projecting guide ribs with which roller portions of the chain are brought into slide contact are formed on respective surfaces of both wall portions which face the chain passage.

According to an object of an embodiment of the present invention, since the front end position of the inner side wall which constitutes the chain passage of the chain guide is arranged behind the front end of the outer side wall, mud which arrives at an inlet of the outer side wall side can be discharged to the outside from the front end of the inner side wall.

According to an object of an embodiment of the present invention, since the discharge recessed portion which opens frontwardly is formed in the inner side wall of the chain passage, mud or the like which arrives at the front end portion of the outer side wall which constitutes an inlet of the chain guide can be discharged to the outside from the discharge recessed portion formed in the inner side wall whereby mud or the like can be discharged at a plurality of portions including an outlet side.

According to an embodiment of the present invention, since the communication portion which allows the communication between the chain passage and the outside is formed in the inner side wall, mud or the like can be discharged to the outside from the communication portion whereby mud or the like can be discharged at a plurality of portions including an outlet side.

According to the chain guide device of an embodiment of the present invention, at the time of mounting the chain guide plate on the chain guide, the chain guide plate is positioned with respect to the chain guide by the fitting engagement between the positioning projecting portion and the positioning recessed portion. Thus, the positioning of the chain guide plate is facilitated for enhancing the operational efficiency of an assembling operation.

According to the chain guide device an embodiment of the present invention, the guide ribs which guide the chain are formed in a projecting manner on both of the upper wall and the bottom wall which constitute the chain passage of the chain guide. Thus, it is possible to guide the chain not only by the bottom wall side but also by the upper wall and, at the same time, an opening area of an inlet is decreased thus making the intrusion of mud or the like difficult whereby it is possible to effectively prevent the intrusion of the mud or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the respective directions such as the longitudinal direction, the lateral direction and the vertical direction are determined using an advancing state of a vehicle as the reference and the advancing direction is determined as the frontward direction. Further, the inside and the outside are determined such that the inside is a side close to the center of a vehicle body and the outside is a side remote from the center of the vehicle body.

Figure 1:
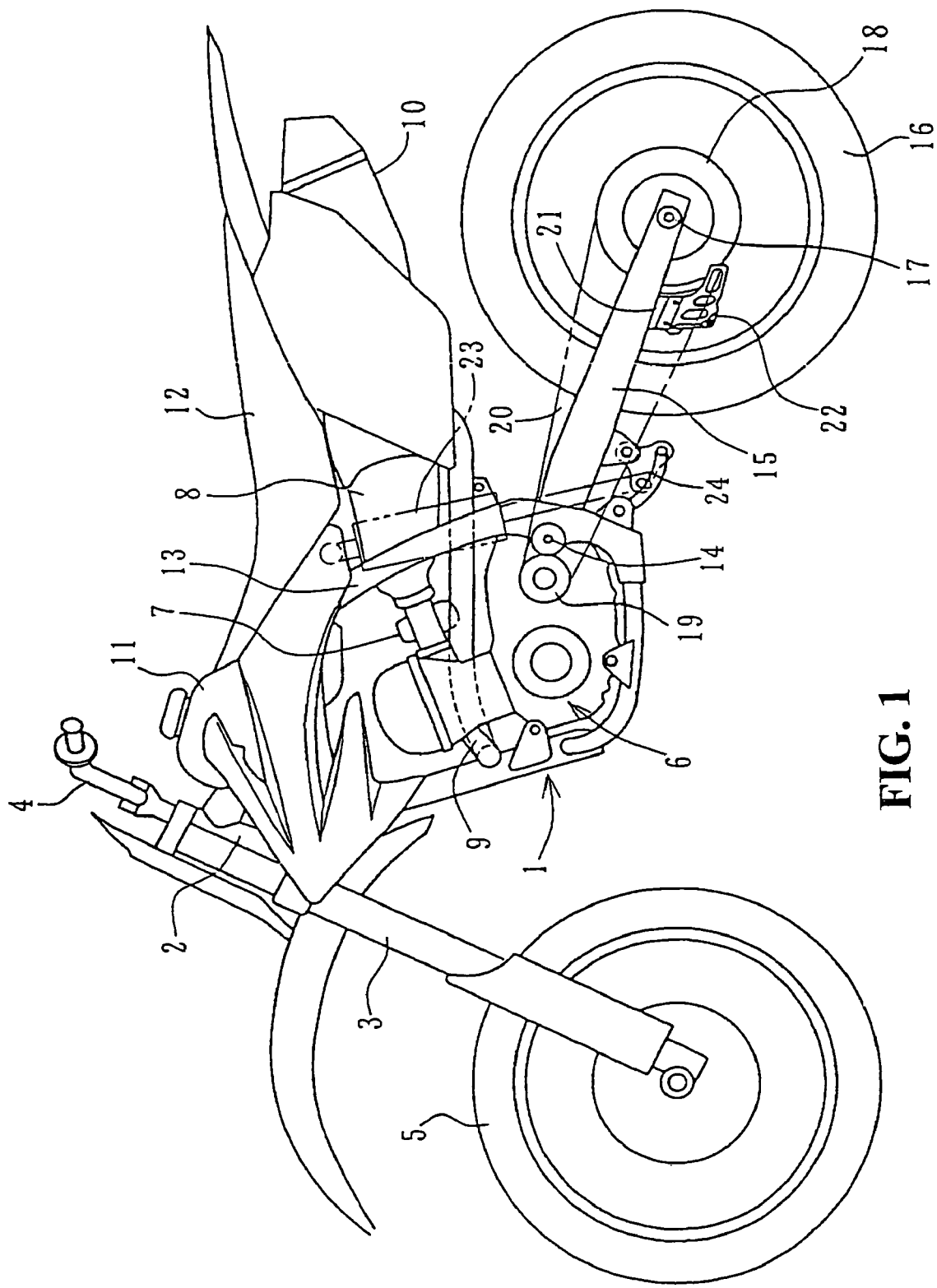
FIG. 1 is a side view of a motorcycle according to the present invention.

Hereinafter, one embodiment is explained in conjunction with the drawings. FIG. 1 is a side view of an off-road type motorcycle to which the present invention is applied.

In this motorcycle, a front fork 3 is rotatably supported on a head pipe 2 which is mounted on a front end of a vehicle body frame 1. A front wheel 5 is supported on a lower end of the front fork 3 and is steered by a handle 4 which is mounted on an upper end of the front fork 3.

An engine 6 is supported on the vehicle body frame 1. A carburetor 7 is provided together with an air cleaner 8, an exhaust pipe 9, and a muffler 10. A fuel tank 11 is supported in the vehicle body frame 1 and a seat 12 is provided behind the fuel tank 11.

A front end of a rear arm 15 is tiltably supported on a pivot pipe 13 which extends in the vertical direction behind the engine 6 by way of a pivot shaft 14. The rear arm 15 has a square pipe shape and is formed by a suitable method using a suitable metal material such as aluminum alloy or the like. A rear wheel 16 is supported on a rear end of the rear arm 15 by way of an axle 17, and a chain 20 extends between and is wound around a driven sprocket wheel 18 which is coaxially provided with the rear wheel 16 about the axle 17 and an output sprocket wheel 19 of the engine 6.

A lower line of the chain 20 penetrates a chain guide 22 which is mounted in the vicinity of the driven sprocket wheel 18 of the rear arm 15 by way of a chain guide stay 21. Thus, the lower line of the chain 20 is slidably guided by the chain guide 22 and the slackening of the lower line of the chain 20 is restricted. A rear shock absorber 23 is provided between the pivot pipe 13 and the rear arm 15 by way of a link 24 arranged below a front portion of the rear arm 15.

Figure 2:
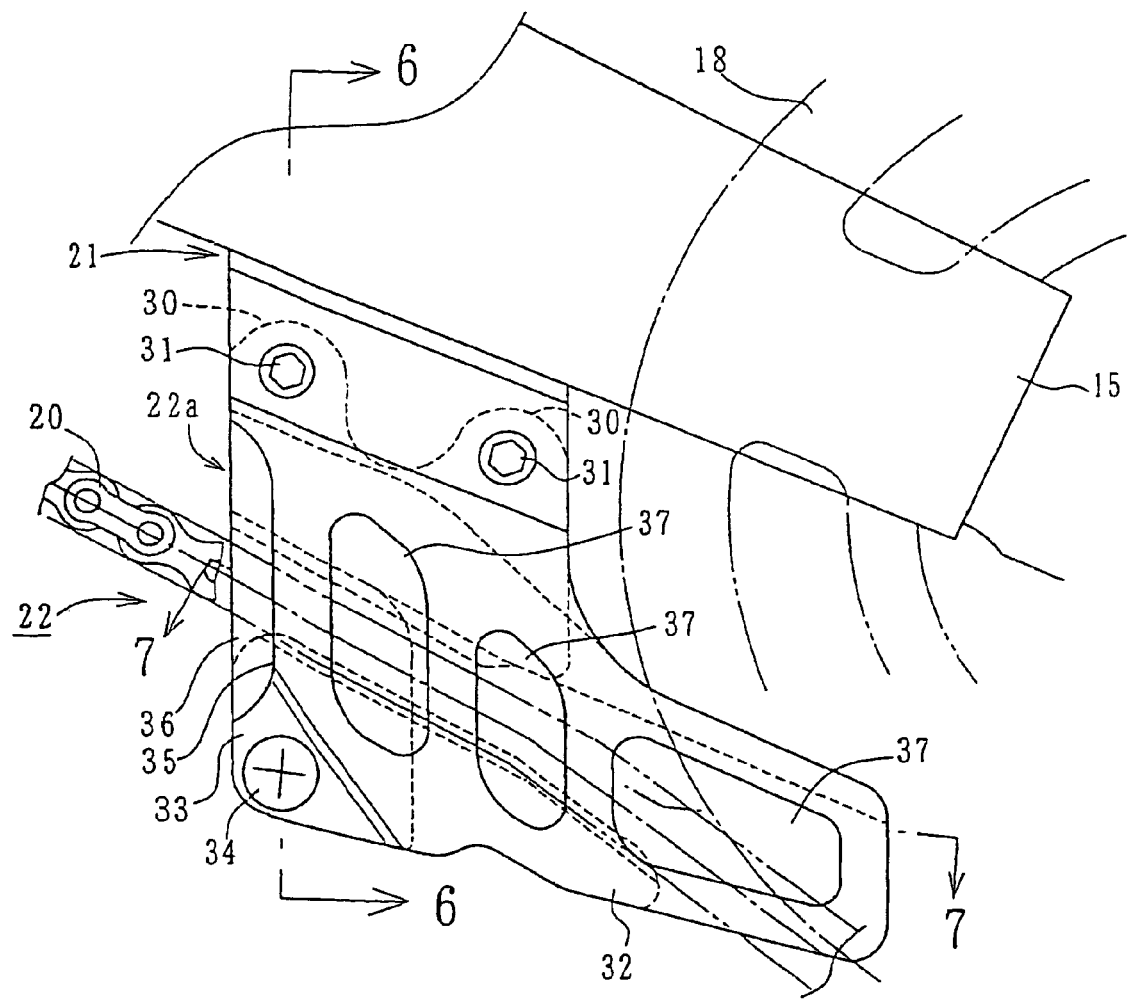
FIG. 2 is an enlarged view of a chain guide portion in FIG. 1.

FIG. 2 is a view which enlarges the portion of the chain guide 22 in FIG. 1. The chain guide 22 is approximately an L-shape in a side view (in an illustrated state), wherein an upper boss 30 is formed on a front upper portion of the chain guide 22 and is mounted on an inner side of the chain guide stay 21 in an overlapped manner using bolts 31. An outer surface of the chain guide stay 21 is covered with the chain guide plate 32 which is formed of a suitable rigid material made of a light alloy such as aluminum alloy or the like.

The chain guide plate 32 has a mounting corner portion 33 thereof which is formed on a front lower end portion thereof mounted to the chain guide 22 using a bolt 34. A notched positioning recessed portion 35 is formed in a front end portion of the chain guide plate 32 and a positioning projecting portion 36 is fitted in the positioning recessed portion 35. A plurality of weight reducing holes 37 are formed in a side surface of the chain guide plate 32 in the longitudinal direction.

Figure 3:
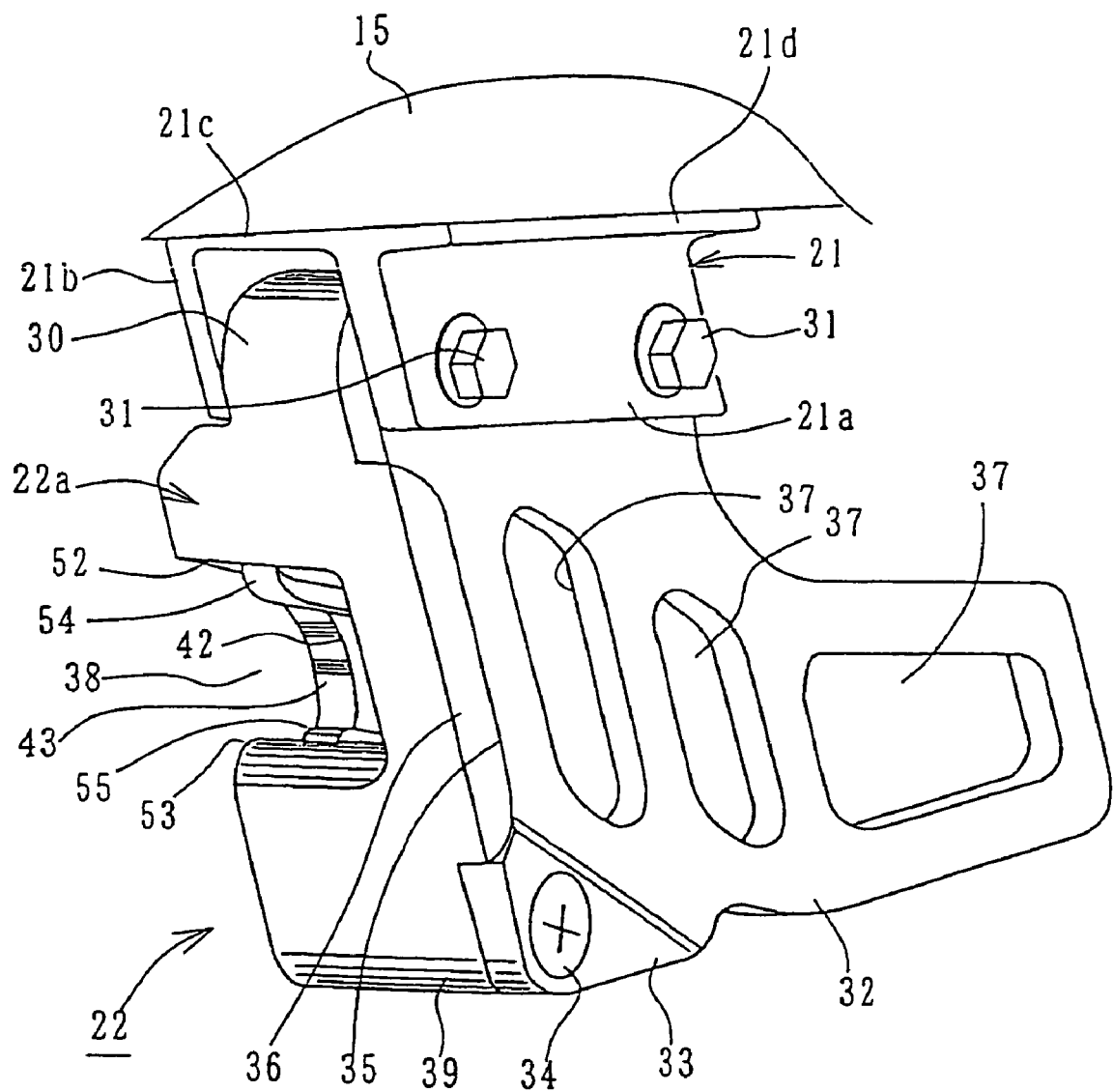
FIG. 3 is a perspective view showing the chain guide as viewed from the front side and the outside.

FIG. 3 shows a state in which the chain guide 22 is mounted on the rear arm 15. Further, FIG. 3 is a perspective view showing the chain guide 22 in a state wherein the chain guide plate 32 is mounted on the rear arm 15 as viewed from a front side and the outside of the vehicle body. An inlet 38 for the chain is formed in a front surface of the chain guide 22 and a lower boss 39 is formed below the inlet 38.

The chain guide stay 21 is a member having an approximately U-shaped cross section which is opened downwardly, and is made of a suitable metal material such as an aluminum alloy. The chain guide stay 21 includes an outer side wall 21a, an inner side wall 21b, and a ceiling wall 21c which connects an upper portion of these side walls. Flanges 21d project outwardly and are formed on the ceiling wall 21c. The ceiling wall 21c is integrally mounted on a bottom portion of the rear arm 15 by welding or the like.

Figure 4:
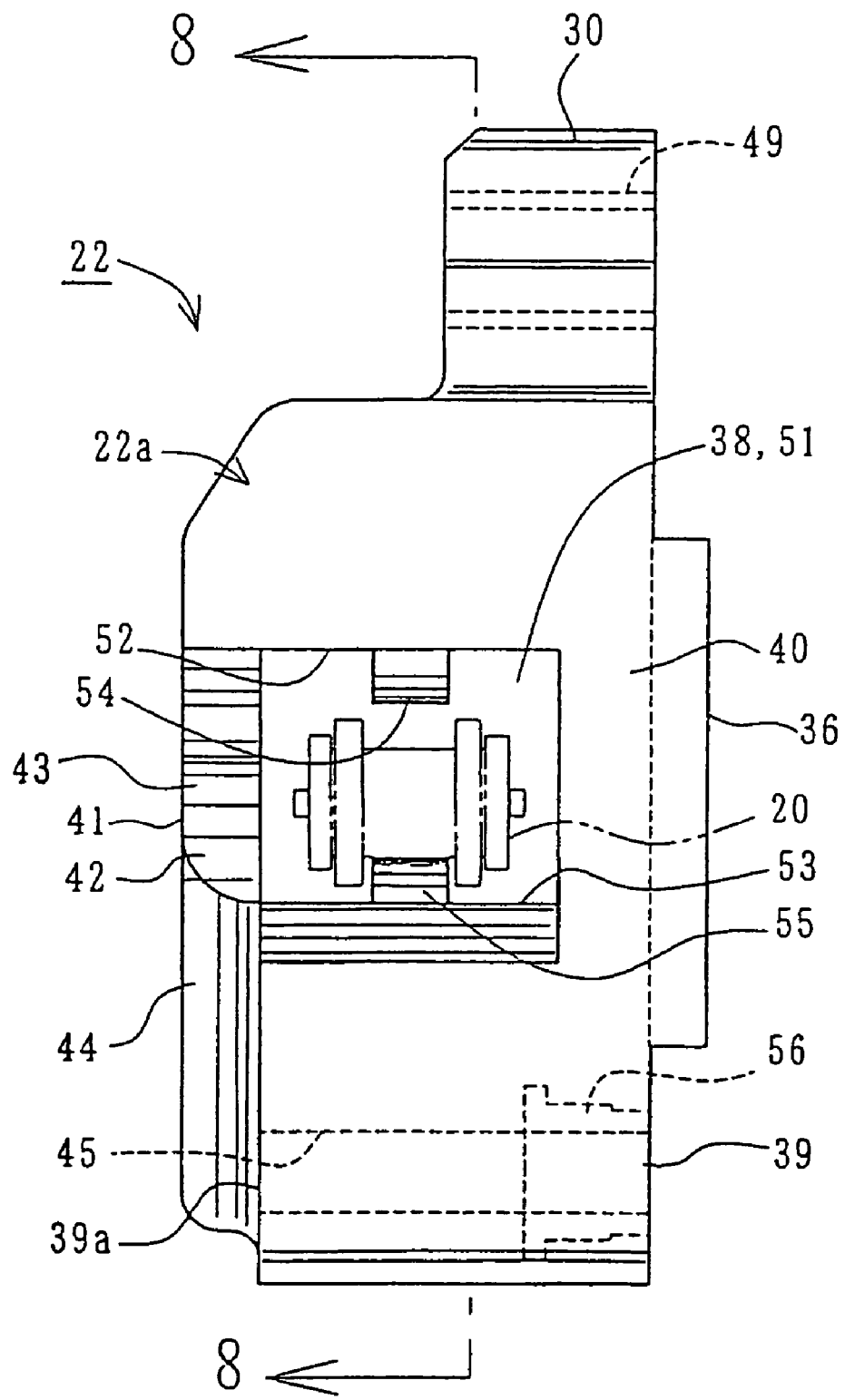
FIG. 4 is a front view of the chain guide.
Figure 5:
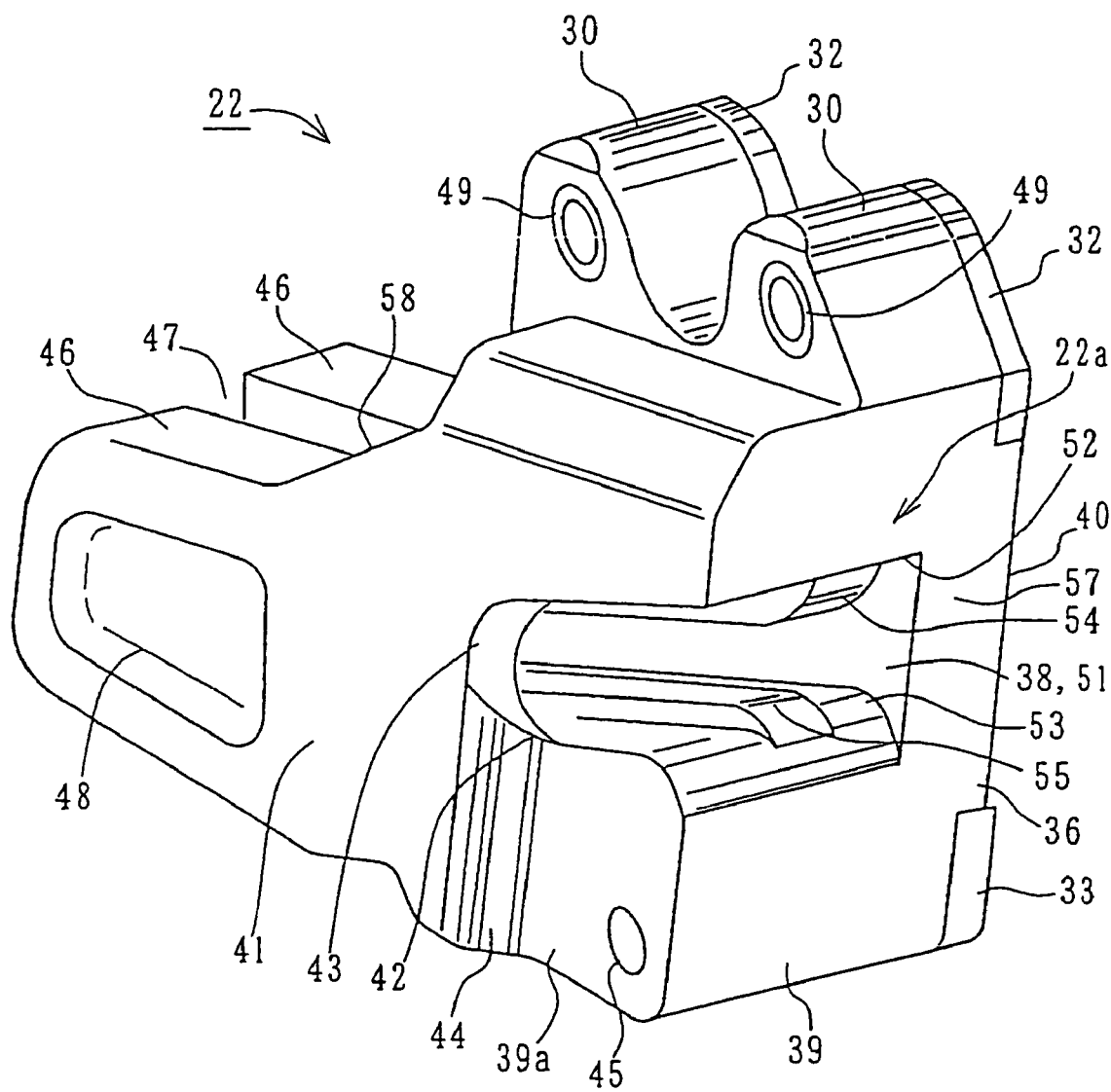
FIG. 5 is a perspective view showing the chain guide as viewed from the front side and the inside.

FIG. 4 is a front view of the chain guide 22. FIG. 5 is a perspective view showing the chain guide 22 as viewed from a front side and an inside of the vehicle body. In these drawings, the chain guide 22 is made of a wear-resistant resilient material such as polyurethane rubber or the like and includes a chain passage 51 which penetrates a body portion 22a in the longitudinal direction.

Out of a wall portion which constitutes the chain passage 51, left and right portions form an outer side wall 40 and an a inner side wall 41, wherein a discharge recessed portion 42 which is opened frontwardly is formed in the inner side wall 41 in a state wherein the discharge recessed portion 42 cuts into the inner side wall 41 from a front side to a rear side and, at the same time, a front end 43 of the inner side wall 41 is formed contiguously with an inner surface 39a of a lower boss 39 by way of a stepped portion 44.

As shown in FIG. 5, a through hole 45 is formed in the lower boss 39 in a penetrating manner in the lateral direction, wherein one end of the through hole 45 opens at the inner surface 39a. Rear extending portions 46 extend rearwardly in an elongate manner from a front portion of the chain guide 22 contiguously and integrally, wherein the rear extending portions are formed on left and right sides (inner and outer sides) while sandwiching a groove 47 therebetween. A weight reducing recessed portion 48 is formed in a side surface of the rear extending portion 46 on the inner side of the vehicle body.

Figure 6:
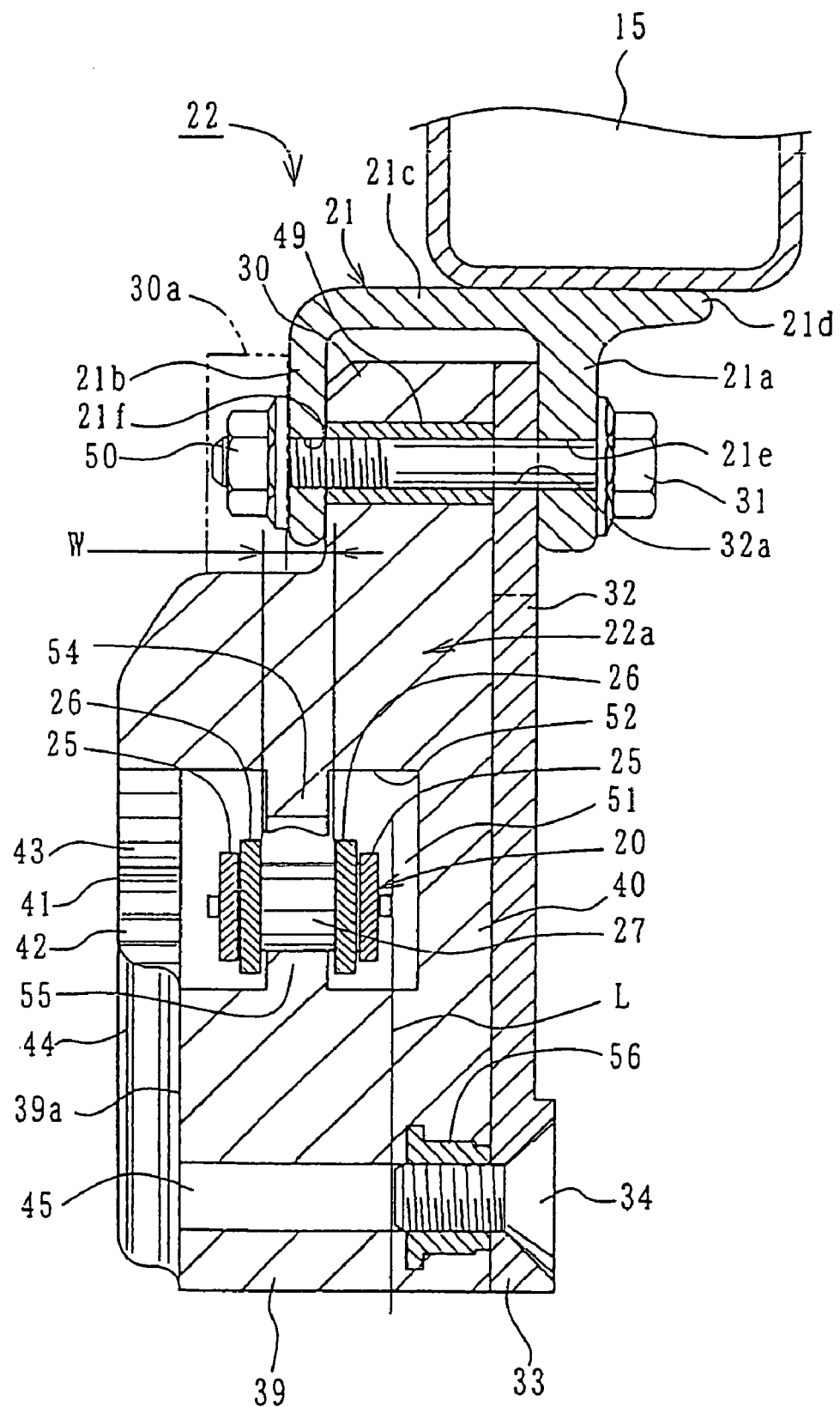
FIG. 6 is a cross-sectional view taken along a line 6-6 in FIG. 2.

FIG. 6 is a cross-sectional view taken along a line 6-6 in FIG. 2. A collar 49 penetrates in the lateral direction and is integrally embedded in the upper boss 30.

Here, as indicated by an imaginary line in the drawing, an inner mounting boss 30a may be integrally formed on the inner side of the inner side wall 21b in an overlapped manner. In this case, by integrally embedding a polygonal nut such as a nut having a hexagonal outer periphery in the inside of a thick wall portion of the inner mounting boss 30a, it is possible to integrally form the polygonal nut in a state wherein the rotation of the nut is prevented. Thus, the fastening of a bolt 31 is facilitated.

In a state where an upper portion of the chain guide plate 32 is overlapped to an outer surface of the upper boss 30, the upper boss 30 is fitted between the outer side wall 21a and the inner side wall 21b. A through hole 21e is formed in the outer side wall 21a and a through hole 32a is formed in an upper portion of the chain guide plate 32. The through holes 21e, 32a are aligned with one end of a collar 49. A distal end of the bolt 31 penetrates the through holes 21e, 32a and projects from a through hole 21f formed in the inner side wall 21b, and is fastened by a nut 50 whereby the chain guide 22 is mounted on the chain guide stay 21.

The wall portion of the chain guide 22 which constitutes the chain passage 51 includes an upper wall portion 52 and a bottom wall 53 on upper and lower portions thereof, wherein the chain passage 51 is surrounded by the outer side wall 40 and the inner side wall 41 as well as the upper wall portion 52 and the bottom wall 53. Since the discharge recessed portion 42 is formed in a front portion of the inner side wall 41, a front portion of the chain passage 51 is opened to the inside of the vehicle body.

On the upper wall portion 52 which faces the chain passage 51, an upper guide rib 54 which projects downwardly is integrally formed, while on the bottom wall 53, a lower guide rib 55 which is arranged at the same position as the upper guide rib 54 in the lateral direction and projects upwardly is integrally formed.

The chain 20 includes outer link plates 25 and inner link plates 26 which are provided in respective left and right pairs and rollers 27 which are arranged inside these link plates 25, 26 for connecting the respective left and right link plates.

The upper guide rib 54 and the lower guide rib 55 are arranged at positions which allow the upper guide rib 54 and the lower guide rib 55 to respectively enter the inside of the left and right inner link plates 26, 26 and to slidably contact the rollers 27. Respective lateral widths of the guide ribs are set smaller than an axial width of the roller 27. Symbol W indicates a distance between the left and right inner link plates 26, 26.

In the lower boss 39, a nut 56 which is coaxial with a through hole 45 is integrally embedded in a state wherein the nut 56 is offset to the outer side wall 40 side, and a bolt 34 is threaded into the nut 56. Lengths of the bolt 34 and the nut 56 are relatively short such that the respective inner distal ends are positioned outside than an outer line L of the chain 20.

Figure 7:
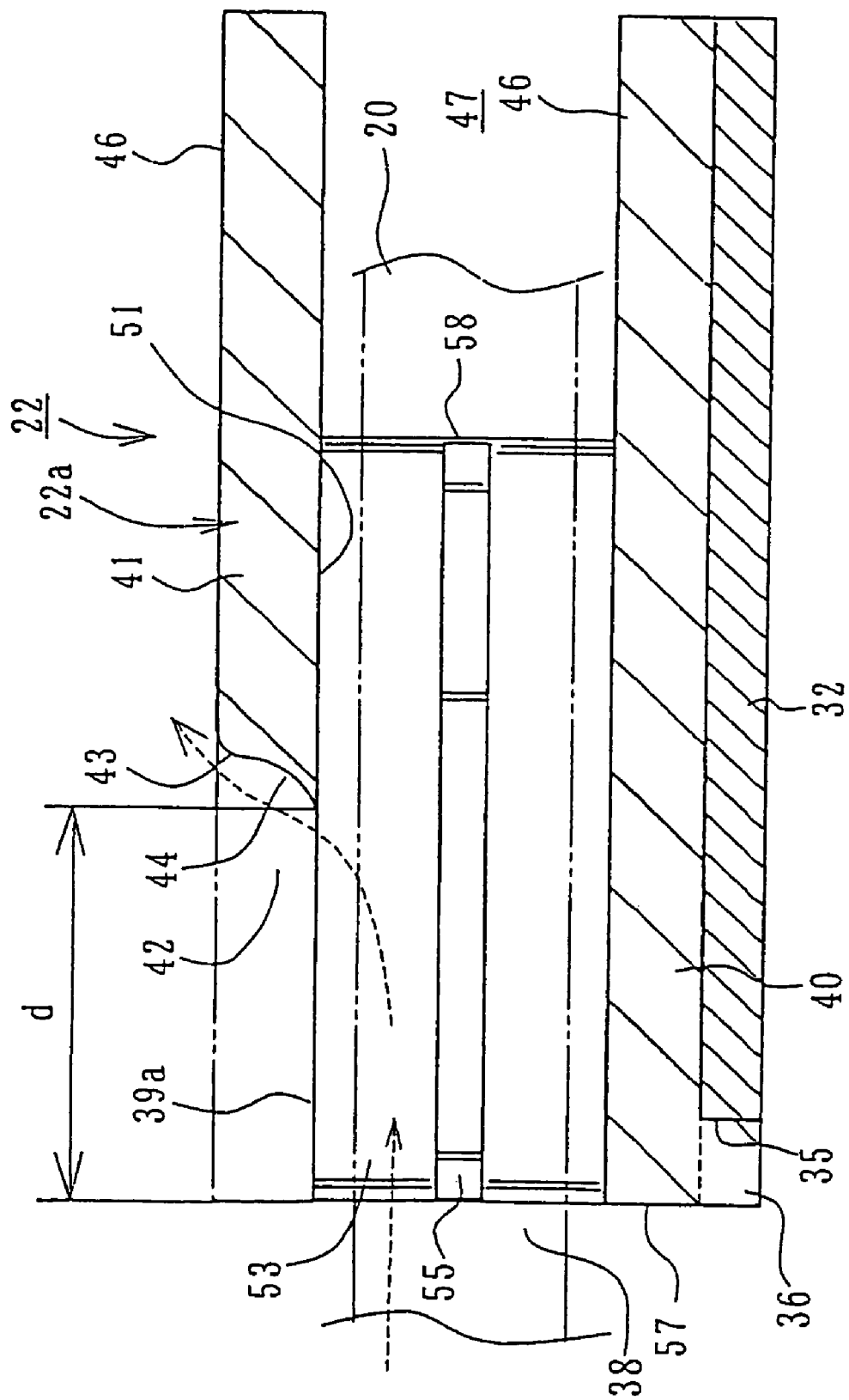
FIG. 7 is a cross-sectional view taken along a line 7-7 in FIG. 2.

FIG. 7 is a cross-sectional view taken along a line 7-7 in FIG. 2. The front end portion 43 of the inner side wall 41 is arranged at a position which is retracted rearwardly by a dimension d with respect to a front end portion 57 of the outer sidewall 40. The front end portion 43 also constitutes a bottom portion of the discharge recessed portion 42. Since the discharge recessed portion 42 is opened frontwardly. Thus, a front portion of the chain passage 51 is in communication with the outside by way of the discharge recessed portion 42.

The chain passage 51 forms a tunnel-like shape and penetrates a body portion 22a of the chain guide 22 in the longitudinal direction. An outlet 58 of the passage opens at a rear end portion of the body portion 22a and is positioned at a longitudinally middle portion of the chain guide 22, wherein the chain passage 51 is communicated with the groove 47 at the outlet 58.

Further, as can be clearly understood from FIG. 7, the positioning projecting portion 36 is formed to have a large wall thickness by projecting outwardly from a general surface of the outer side wall 40 and is fitted in the positioning recessed portion 35 formed in the chain guide plate 32 and a front side and a front side of the positioning recessed portion 35, wherein at the time of fitting engagement, outer surfaces of the positioning projecting portion 36 and the chain guide plate 32 become coplanar. Further, a front end of the positioning projecting portion 36 and a front end of the outer side wall 40 are coplanar, and the positioning recessed portion 35 and the positioning projecting portion 36 are formed in a range in which the positioning recessed portion 35 and the positioning projecting portion 36 are overlapped to the chain in a side view.

Figure 8:
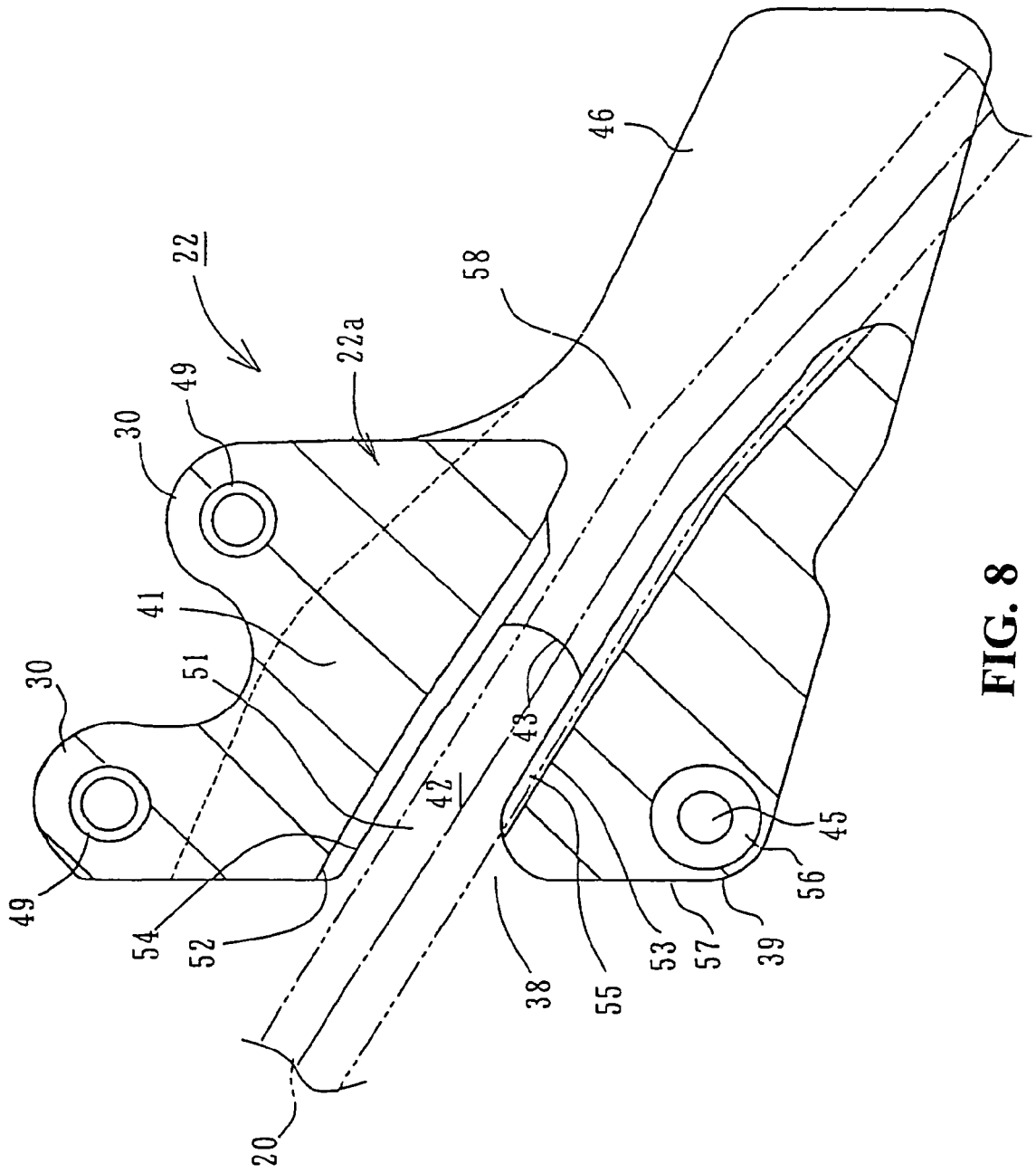
FIG. 8 is a cross-sectional view taken along a line 8-8 in FIG. 4.

FIG. 8 is a cross-sectional view taken along a line 8-8 in FIG. 4. The upper wall portion 52 is formed in an inclined surface shape which lowers rearwardly, and the upper guide rib 54 is formed as a projection which extends in the longitudinal direction in an elongated manner along the inclination of the upper wall portion 52, wherein a longitudinal length of the upper guide rib 54 is within a range of the front portion 22a and terminates in front of the rear extending portion 46. Front and rear ends of the upper guide rib 54 are chamfered in a curved shape.

The bottom wall 53 also forms an inclined surface which lowers rearwardly, and the lower guide rib 55 also is formed as the projection which extends in the longitudinal direction in an elongate manner along the inclination of the bottom wall 53, wherein the lower guide rib 55 is formed within the range of the body portion 22a and, at the same time, both longitudinal ends of the lower guide rib 55 are also formed in a chamfered curved shape.

Further, the upper wall portion 52 extends frontwardly relative to the bottom wall 53. Thus, the upper guide rib 54 is formed in a state wherein the upper guide rib 54 projects frontwardly relative to the lower guide rib 55. Further, a rear end portion side of the bottom wall 53 extends rearwardly in an elongated manner relative to the upper wall portion 52. Thus, the lower guide rib 55 extends rearwardly in an elongated manner relative to the upper guide rib 54.

Next, the manner of operation of the chain guide device is explained. Since the chain 20 penetrates the chain passage 51 of the chain guide 22, the chain 20 is guided toward a rear portion of the vehicle by the outer side wall 40, the inner side wall 41, the upper wall portion 52 and the bottom wall 53 of the chain guide 22 and is brought into slight contact with the lower guide rib 55 whereby the slackening of the chain 20 is restricting.

Further, during operation on a terrain or the like, at the time of performing a cornering by inclining the vehicle body to the side on which the chain guide 22 is arranged or at the time of performing a track traveling or the like, when the motorcycle is operated while bringing the outer side wall 40 of the chain guide 22 into contact with a muddy road surface, the mud intrudes on the inside of the chain guide 22 from the vicinity of the chain inlet of the chain guide. When the mud or the like arrives at the inlet 38 of the chain guide 22, the mud is carried to the inside of the chain passage 51 by the chain 20.

However, since the front end portion 43 of the inner side wall 41 is retracted from the front end portion 57 of the outer side wall 40, the frontward side of the front end portion 43 defines the discharge recessed portion 42 whereby the mud or the like which arrives at the vicinity of the inlet 38 falls into the inside of the vehicle from the discharge recessed portion 42 in front of the front end portion 43 and is smoothly discharged to the outside (a discharge path being indicated by a broken line in FIG. 7). Accordingly, the amount of mud which is carried to the inside of the chain passage 51 behind the front end portion 43 can be decreased.

Further, the discharge recessed portion 42 is formed in front of the front end portion 43. The discharge recessed portion 42 opens frontwardly, a front portion of the chain passage 51 which is arranged on a side in front of the front end portion 43 and the outside are communicated with each other, the front end portion 43 is contiguously formed with the stepped portion 44, and the stepped portion forms the curved surface which gradually opens toward the inside of the vehicle body rearwardly. Thus, the discharge recessed portion 42 and the stepped portion 44 constitute a discharge guide portion for mud or the like whereby it is possible to allow the mud or the like to smoothly fall into the inside of the vehicle body which constitutes the outside from the chain guide 22 in front of the front end portion 43.

Accordingly, it is possible to positively discharge the mud or the like not only from the outlet 58 side but also from the inlet 38 side. Thus, it is possible to discharge the mud at a plurality of portions whereby it is possible to obtain a chain guide structure which is particularly suitable for an off-road vehicle which has many chances of being operated on terrain where the motorcycle is liable to be splashed with mud or the like.

Further, the guide ribs 54, 55, which guide the chain 20, are formed on both of the upper wall portion 52 and the bottom wall 53 of the chain passage 51 whereby it is possible to guide not only the bottom surface but also the upper surface of the chain 20.

Further, with respect to the chain 20, the rollers 27 are brought into contact with the lower guide rib 55 prior to the inner and outer link plates 25, 26. Accordingly, before the inner and outer link plates 25, 26 are brought into contact with the bottom wall 53, the rollers 27 are brought into contact with the lower guide rib 55. Thus, it is possible to enhance the wear resistance compared to a case in which the inner and outer link plates 25, 26 are directly brought into contact with the lower guide rib 55.

Further, the guide rib 54 is arranged at the position where the guide rib 54 is overlapped to the inner side wall 21b of the chain guide stay 21 in the vertical direction and, at the same time, the guide rib 54 is arranged inside the left and right inner link plates 26, 26 which constitute the chain 20.

Accordingly, a distance until the chain 20 is brought into contact with the lower end of the inner side wall 21b in the chain guide stay 21 which defines a wear limit of the upper wall portion 52 can be surely set to a value which is increased by an amount of the difference between a vertical width of the inner link plate 26 and a diameter of the roller 27.

Further, by accommodating the inner side wall 21b of the chain guide stay 21 within a width between the left right inner link plates 26, 26 of the chain 20, the chain guide stay 21 can be miniaturized and a width of the upper boss 30 which forms a mounting portion of the chain guide 22 can be reduced.

Further, also with respect to the bottom wall 53, the nut 56 and the bolt 34 are formed with short lengths and are offset toward the outer side wall 40 side such that the nut 56 and the bolt 34 are arranged further outside than the line Z which indicates the outside of the lateral width of the chain 20, that is, in a portion outside a range in which the chain is brought into contact with the bottom wall 53. Accordingly, the wear limit of the bottom wall 53 becomes a lower end portion of the bottom wall 53. Thus, there is no possibility that the chain 20 is brought into contact with the nut 56 and the bolt 34 in a preceding wear progressing stage. As a result, it is possible to ensure a large wear range. Thus, it is not necessary to extend the lower end portion of the chain guide 22 downwardly whereby the minimum height above the ground can be ensured.

The positioning recessed portion 35 is formed on the front side of the chain guide plate 32 and the positioning projecting portion 36 which is contiguously and integrally formed with the chain guide 22 is fitted in the positioning recessed portion 35. Thus, in overlapping the chain guide plate 32 to the chain guide 22, it is possible to position the positioning recessed portion 35. As a result, the positioning is facilitated thus enhancing the efficiency of the assembling operation. Further, even when the chain 20 is swung laterally, the chain 20 is hardly brought into contact with the front end portion of the chain guide plate 32. Thus, the contact, between metals can be prevented.

The present invention is not limited to the above-mentioned embodiment and various applications and modifications are conceivable. For example, the discharge recessed portion 42 is not always limited to the constitution in which the discharge recessed portion 42 is formed in front of the front end portion 43 of the inner side wall 41. That is, an opening portion may be formed in a longitudinally middle portion or the like of the inner side wall 41 and the opening may be communicated with the chain passage 51. In this case, the opening which constitutes the discharge recessed portion 42 is provided at a position behind the front end portion of the outer side wall 40.

Further, the wall portion which surrounds the chain passage 51 is not continuously closed but a portion of the wall portion may be cut.

Still further, the vehicle to which the present invention is applicable is not limited to a motorcycle. The present invention is applicable to any chain driven vehicle.

Particularly, the present invention is preferably applicable to off-road vehicle such as a buggy car.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain guide device adapted to be mounted on a swing arm for supporting a rear wheel driven by a chain by way of a chain guide stay, comprising:
   an inner side wall;
   an outer side wall, said inner side wall and said outer side wall being arranged along left and right sides of the chain as portions of a wall portion of a chain passage with the chain penetrating therethrough in a longitudinal direction; and
   a front end portion of the inner side wall being positioned behind a front end portion of the outer side wall,
   wherein the front end portion of the inner side wall is formed contiguously with an inner surface of a lower boss by way of a stepped portion which steps inwardly toward the chain at a forward end of the chain guide device,
   wherein the inner surface of the lower boss is disposed forwardly of the stepped portion, and is parallel to and disposed inwardly with respect to a rear end portion of the inner side wall.

2. The chain guide device according to claim 1, and further including a chain guide plate which is mounted on an outside of the outer side wall in an overlapped manner, a positioning recessed portion which is opened frontwardly is formed in a front end portion of the chain guide plate; and a positioning projecting portion projecting outwardly and being integrally formed on a side surface of the outer side wall, said positioning projecting portion being fitted in the positioning recessed portion such that the positioning recessed portion extends under a lower-most portion of the positioning projecting portion.

3. The chain guide device according to claim 1, and further including an upper wall portion and a lower wall portion which constitute upper and lower portions thereof as a portion of the chain passage; and projecting guide ribs with which roller portions of the chain are brought into slide contact are formed on respective surfaces of both wall portions which face the chain passage.

4. The chain guide device according to claim 1, wherein the outer side wall includes at least one aperture therein for reducing the weight of the chain guide device.

5. The chain guide device according to claim 1, and further including a chain guide stay adapted to be secured to the swing arm for mounting the chain guide device relative thereto.

6. The chain guide device according to claim 1, wherein 1 a front face of a body portion of the chain guide device has a width at an upper thereof that is greater than at a lower portion thereof.

7. The chain guide device according to claim 2, wherein the chain guide plate is not mounted on the inner side wall.

8. A chain guide device adapted to be mounted on a swing arm for supporting a rear wheel driven by a chain by way of a chain guide stay, comprising:

an inner side wall;

an outer side wall, said inner side wall and said outer side wall being arranged along left and right sides of the chain as portions of a wall portion of a chain passage with the chain penetrating therethrough in a longitudinal direction; and a U-shaped discharge recessed portion being opened frontwardly from a front end portion of the inner side wall, wherein the U-shaped discharge recessed portion is visible when a lateral side of the chain guide device on which the inner side wall is provided is viewed in elevation view, and is not visible when an opposite lateral side of the chain guide device on which the outer side wall is provided is viewed in elevation view.

9. The chain guide device according to claim 8, and further including a chain guide plate which is mounted on an outside of the outer side wall in an overlapped manner, a positioning recessed portion which is opened frontwardly is formed in a front end portion of the chain guide plate; and a positioning projecting portion projecting outwardly and being integrally formed on a side surface of the outer side wall, said positioning projecting portion being fitted in the positioning recessed portion such that the positioning recessed portion extends under a lower-most portion of the positioning projecting portion.

10. The chain guide device according to claim 8, and further including an upper wall portion and a lower wall portion which constitute upper and lower portions thereof as a portion of the chain passage; and projecting guide ribs with which roller portions of the chain are brought into slide contact are formed on respective surfaces of both wall portions which face the chain passage with a discharge recessed portion formed forward of the front end portion of the inner side wall.

11. The chain guide device according to claim 8, wherein the outer side wall includes at least one aperture therein for reducing the weight of the chain guide device.

12. The chain guide device according to claim 8, and further including a chain guide stay adapted to be secured to the swing arm for mounting the chain guide device relative thereto.

13. The chain guide device according to claim 9, wherein the chain guide plate is not mounted on the inner side wall.

14. The chain guide device according to claim 13, wherein the wear-resistant resilient material is a polyurethane rubber material.

15. A chain guide device adapted to be mounted on a swing arm for supporting a rear wheel driven by a chain by way of a chain guide stay, comprising:

an inner side wall;

an outer side wall, said inner side wall and said outer side wall being arranged along left and right sides of the chain as portions of a wall portion of a chain passage with the chain penetrating therethrough in a longitudinal direction; and further including a chain guide plate which is mounted on an outside of the outer side wall in an overlapped manner, a U-shaped positioning recessed portion which is opened frontwardly is formed in a front end portion of the chain guide plate; and a positioning projecting portion projecting outwardly and being integrally formed on a side surface of the outer side wall, said positioning projecting portion being fitted in the U-shaped positioning recessed portion, wherein the U-shaped positioning recessed portion of the chain guide plate is visible when a lateral side of the chain guide device on which the outer side wall is provided is viewed in elevation view, and is not visible when an opposite lateral side of the chain guide device on which the inner side wall is provided is viewed in elevation view.

16. The chain guide device according to claim 15, and further including an upper wall portion and a lower wall portion which constitute upper and lower portions thereof as a portion of the chain passage; and projecting guide ribs with which roller portions of the chain are brought into slide contact are formed on respective surfaces of both wall portions which face the chain passage.

17. The chain guide device according to claim 15, wherein the outer side wall includes at least one aperture therein for reducing the weight of the chain guide device.

18. The chain guide device according to claim 15, and further including a chain guide stay adapted to be secured to the swing arm for mounting the chain guide device relative thereto.

19. The chain guide device according to claim 15, wherein the chain guide device is constructed of a wear-resistant resilient material.

20. The chain guide device according to claim 15, wherein the chain guide plate is not mounted on the inner side wall.

* * * * *